Oct. 29, 1940.  F. H. ROHR  2,219,752
UNIVERSAL TUBE JOINT
Filed Oct. 5, 1938
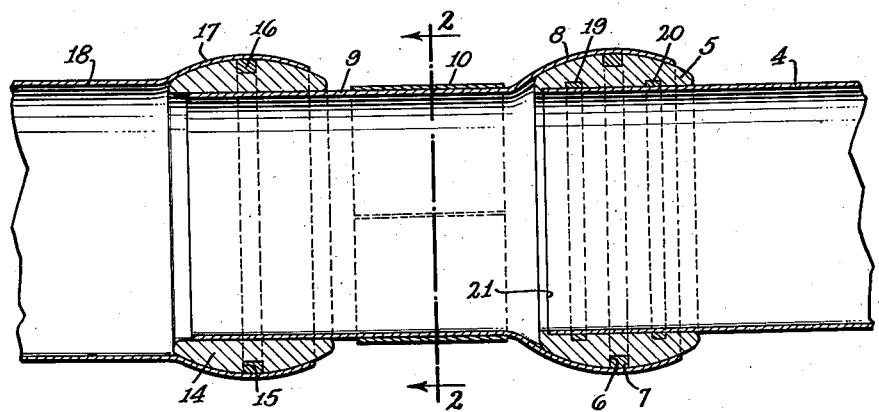
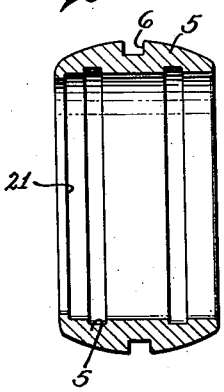
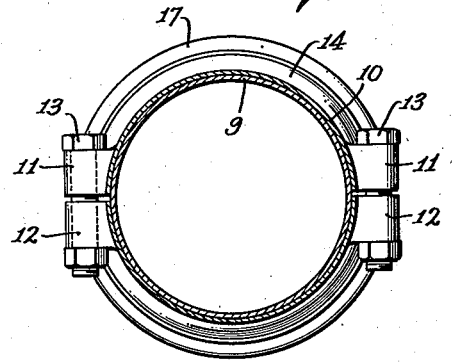
Inventor
FRED H. ROHR,
By Everett N. Curtis
Attorney Patented Oct. 29, 1940

2,219,752

UNITED STATES PATENT OFFICE 2,219,752

UNIVERSAL TUBE JOINT

Fred H. Rohr, Mission Beach, Calif., assignor of one-half to The Ryan Aeronautical Co., San Diego, Calif., a corporation of California Application October 5, 1938, Serial No. 233,417

4 Claims. (Cl. 285—92)

My invention relates to universal tube joints, particularly those used for making connection between the exhaust ports of flexibly mounted combustion engines and discharge manifolds mounted some distance away upon the main frame, and its objects are, to eliminate friction and prevent binding or what is commonly known as "freezing" or "seizing" of the operative parts; to guard against leakage and the creation of fire hazards; to make the operative parts flexible and self adjusting; to render operation of the parts effective despite extreme temperatures of heat or cold and lack of uniformity of expansion occasioned by reason of the use of different materials, to permit at all times complete freedom of movement of the joint in accordance with the movement of the engine carrying the exhaust port, and in general to simplify the construction and render more effective the operation of the several parts.

It is well recognized that in the use of combustion engines now on the market considerable difficulty is experienced in properly conducting away of the heated exhaust gases, and in the preventing of leakage of such gases through joints of the conduits on account of the varying expansion and contraction of the parts, particularly where different materials are used. Also where combustion engines are flexibly mounted, as is ordinarily the case with motor vehicles or air planes to prevent vibration from being carried into the structure, it has been found difficult to provide adequate and efficient gas-tight connections to the discharge manifolds. These difficulties and imperfections have been overcome and remedied in my improved tube joint which primarily consists in the provision of telescopic connections of the ball and socket type, having sealing rings similar to piston rings for eliminating leakage, the construction being such as to permit at all times free and self adjusting movement of the parts in any direction and to permit the unobstructed passage of heated fluids from combustion engine exhausts.

My invention further consists in various other features and improvements illustrated in the drawing and hereinafter more particularly described and claimed.

Attention is hereby directed to the drawing in which similar numerals of designation refer to similar parts throughout the several views, and in which—

Figure 1 is a longitudinal vertical section through one of the preferred forms of my improved tube joint;

Fig. 2 is a transverse vertical section on line 2—2 of Fig. 1, looking in the direction of the arrows, and Fig. 3 is a section of one of the cuff members, showing the same removed from its sleeve or socket, and illustrating the position of the sealing ring slots.

Referring to the drawing, the tube 4 is of the usual form of outlet leading from the engine exhaust port to which it is rigidly connected. Such engine may or may not be flexibly mounted, it is universally recognized that there is always some movement of the engine due to vibration and some movement occasioned by the expansion or contraction of the engine parts by reason of changes of temperature. Upon the outer end of the tube 4 is mounted the cuff 5 of substantial thickness relative to, and as compared with, the wall of said tube; and, preferably provided in its inner wall with annular slots in which are installed the sealing rings 19 and 20, similar to piston rings and serving a similar purpose. Preferably I furnish the said cuff with an annular stop 21 for the purpose of holding the adjacent end of the tube 4 from extending beyond the edge of the cuff 5. The outer periphery of the cuff 5 is made spherical in contour to engage with the similarly shaped inner surface of the socket 8 of the sleeve 9. As will be observed, this construction is of the ball and socket type and forms a universal joint permitting movement at any required angle. In order to secure a gas tight joint, I preferably form in the outer wall of the cuff 5, the annular slot 6, in which is installed the sealing ring 7.

Upon the end of the sleeve 9, opposite to the socket 8, I mount the cuff 14, which is similar in construction to the cuff 5, and which if desired may be supplied with the same kind of annular slots and sealing rings, although not fully illustrated in the drawing. As with the cuff 5, the periphery of cuff 14 is made spherical in contour to engage with the similarly shaped inner surface of the socket 17 of the sleeve 18, and forms the same type of ball and socket joint. In order to hold the sleeves 9 and 18 in proper operative spaced relationship, I preferably embrace the outer wall of the sleeve 9, adjacent to the socket 8, with the split collar 10 the two parts of which are held together by the securing bolts 13 passing through openings in ears 11 and 12.

The outer end of the sleeve 18, being secured to the exhaust manifolds, renders the sleeve as a whole practically stationary except as moved by changes of temperature, although permitting a telescopic movement of sleeve 9 within the cuff 14 which movement is limited by the collar 10. If desired, a stop similar to stop 21 of cuff 5 may be supplied, to prevent the end of sleeve 9 from sliding beyond the outer edge of cuff 14; in which case the collar 10 could be dispensed with. It will thus be seen that in addition to the double universal action provided by the two co-operating ball and socket connections, a telescopic or sliding movement of the sleeves 9 and 18, and tube 4, is permitted through the cuffs 5 and 14, thereby allowing freedom of movement in all directions, and automatic adjustment to any position assumed by the combustion engine or discharge manifolds.

Preferably, I employ as suitable material for the tube 4 and sleeves 9 and 18, stainless steel or other heat resistant material, while for the cuffs 5 and 14, I have found that cast iron is the best material, although suitable materials may be substituted. The great advantage of using cast iron is that it retains its shape under high temperatures while at the same time presenting suitable wearing surfaces. Also that the co-efficient of expansion of cast iron is substantially the same as that of stainless steel or other heat resistant material preferably used by me, in this connection. Where my invention is used in discharging exhaust gases from combustion engines, it will be found that the "gyroscopic" movement of such engines where flexibly mounted, as well as any movement of the discharge manifolds by reason of changes of temperature is fully compensated for and taken up automatically by the telescopic and ball and socket construction of my device. And wherever my improved universal slip joint is used for making connection between the ends of pipes or conduits, which are movable to a greater or less degree for any cause whatever, the same self adjusting features will be present and operative to form a gas tight joint for the passage of fluids.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

What I claim and desire to secure by Letters Patent is:

1. In a universal tube joint for making connection between the exhaust ports of combustion engines and discharge manifolds, a pipe member, a cuff slidable thereon and being relatively thicker than the wall of said member, a sleeve member having a socket at one end thereof which is shaped to receive said cuff and within which said cuff is installed so as freely to turn therein, said cuff having an annular groove within its outer wall, and a ring reposing in said groove and in contact with the wall of said socket and serving to prevent the products of combustion from leaking therethrough.

2. In a universal tube joint for making connection between the exhaust ports of combustion engines and discharge manifolds where there is constant vibration of the engine relative to the manifold, a heat resistant pipe member, a one-piece cuff carried thereon and being relatively thicker than the wall of said member, and a heat resistant sleeve member having an integral one-piece socket at one end thereof which is shaped to receive and closely confine said cuff and within which said cuff is installed so as freely to turn therein, said cuff being of a different material but having substantially the same coefficient of expansion.

3. In a universal tube joint for making connection between the exhaust ports of combustion engines and discharge manifolds, a stainless steel pipe member, a cast iron cuff slidable thereon and being relatively thicker than the wall of said member, a stainless steel sleeve member having a one-piece socket at one end thereof which is shaped to receive said cuff and within which said cuff is installed with a relatively close fit but so as freely to turn therein, said cuff having means to prevent the products of combustion from leaking therethrough.

4. In a double universal tube joint for making leak proof connection between the exhaust ports of combustion engines and exhaust manifolds, a plurality of connecting heat resistant tubular members forming a double universal joint, the connection between adjoining members consisting of a separable metallic cuff sliding upon the end of one of said members, which cuff is relatively thicker than the wall of said members; and the end of the adjoining member having a relatively thin one-piece socket shaped to receive said cuff, within which socket said cuff is installed so as freely to turn therein.

FRED H. ROHR.